Aug. 15, 1972    C. W. RAETZSCH    3,684,670
ELECTROLYTIC CELL

Original Filed July 9, 1969    4 Sheets-Sheet 1

INVENTOR
CARL W. RAETZSCH

Chisholm and Spencer
ATTORNEYS

Aug. 15, 1972 C. W. RAETZSCH 3,684,670
ELECTROLYTIC CELL
Original Filed July 9, 1969 4 Sheets-Sheet 3

INVENTOR
CARL W. RAETZSCH

ATTORNEYS

Aug. 15, 1972     C. W. RAETZSCH     3,684,670
ELECTROLYTIC CELL

Original Filed July 9, 1969     4 Sheets-Sheet 4

INVENTOR

CARL W. RAETZSCH

BY

*Chisholm and Spencer*

ATTORNEYS

United States Patent Office 3,684,670
Patented Aug. 15, 1972

BEST AVAILABLE COPY 3,684,670
ELECTROLYTIC CELL
Carl W. Raetzsch, Corpus Christi, Tex., assignor to PPG Industries, Inc., Pittsburgh, Pa.
Continuation of abandoned application Ser. No. 840,399, July 9, 1969, which is a continuation-in-part of application Ser. No. 795,276, Jan. 30, 1969, now Pat. No. 3,616,444. This application Apr. 19, 1971, Ser. No. 135,407
Int. Cl. B01k 1/00, 3/04; C01b 11/26
U.S. Cl. 204—95
16 Claims

ABSTRACT OF THE DISCLOSURE

Disclosed is an electrolytic cell for the continuous production of alkali metal chlorates from alkali metal chlorides having a cathode which includes a pervious plate with a surface that is sloped with respect to the vertical. Electrolysis takes place in the area between the anode and the pervious plate. Gaseous products produced adjacent the pervious plate are passed immediately through the openings in the pervious plate and out of the electrolizing area, thereby preventing gas blinding of the electrodes and producing circulation and back mixing of the solution within the cell.

---

This application is continuation of Ser. No. 840,399, filed July 9, 1969 which in turn is a continuation-in-part of application Ser. No. 795,276, filed Jan. 30, 1969 now U.S. Pat. 3,616,444.

This invention relates to production of alkali metal chlorates from alkali metal chlorides and, in particular, to an electrolytic cell and to a method in which fluid products are removed from the critical area between the electrodes and the solution is circulated within the cell.

Although the present invention is described in terms of its use in converting chlorides to chlorates, the invention is also applicable to use in the conversion of other halides to the corresponding halate and, in its broader aspects, to any similar electrolytic process in which it is desirable to remove buoyant fluid products from the interelectrode space. In the electrolysis of the alkali metal chlorides to form chlorates, hydroxyl ions are formed at the cathode and free chlorine is formed at the anode. A hypochlorite solution is formed upon intermixing of the hydroxyl ion and the free chlorine. The hypochlorite is subsequently oxidized to produce the alkali metal chlorate. The overall chemical reaction, for example, involving sodium chloride may be represented by the equation:

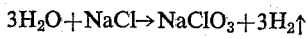

$$3H_2O + NaCl \rightarrow NaClO_3 + 3H_2\uparrow$$

In the past, various provisions have been made for mixing and holding of the intermediate products during formation of the chlorate. One type of cell, disclosed in U.S. Pat. No. 3,350,286, for example, provides a pump that forces the solution between the electrodes and then into a tank where the solution is retained during the completion of the oxidation reaction. Another type of cell, disclosed in U.S. Pat. No. 3,385,779, provides for circulation of the electrolyte between an electrolytic cell and an adjacent tank by the utilization of the product gases, principally hydrogen, which rise between the cathode and the anode. A further type of cell, shown in Canadian Pat. No. 740,862, has a plurality of tubular cathodes, each having a rod-shaped anode extending therethrough and spaced therefrom. The product gases cause the electrolyte to rise in said space between the anode and cathode as electrolysis takes place. Open tubes, called downcomer tubes, are located between adjacent cathodes whereby the electrolyte leaving the upper end of the electrodes is transported to the lower end of the electrodes so that it can pass once again therebetween.

One disadvantage is common to each of the above-described cell structures; namely, that the product gases are permitted or required to pass upwardly between the cathode and anode. This produces what is typically termed "gas blinding." In other words, the accumulation of large amounts of gas bubbles and other cell products in the interelectrode space excludes the electrolyte from the interelectrode space which substantially increases the electrical resistance between the cathode and anode, thus increasing required voltage and decreasing cell power efficiency. The problem of gas blinding becomes substantially greater in cells operating at high temperatures and high current density since the gas evolution is much more voluminous and rapid per unit of time. Such cells may, for example contain sodium chlorate in a range of between 300 and 800 grams per liter, sodium chloride in the range of between 60 and 200 grams per liter, operate at a temperature of between 70° C. and 120° C. and at a current density of between about 1 and 4 amperes per square inch of cathode area. Gas produced adjacent the lower portions of the cathode rises in the interelectrode space joining gas produced adjacent the upper portions of the cathode and, as would be expected, gas blinding is more noticeable as the upper ends of the electrodes are approached. Such gas blinding severely limits the height of the cell that can be economically used and increases the necessary spacing between the anode and cathode.

The present invention provides a new electrolytic cell structure for the production of chlorates in which the electrolytes may be circulated, mixed, and reacted entirely within the cell. The circulation is produced by the rising gaseous products and yet the gaseous products are immediately removed from the critical space between the cathode and anode. The broader aspects of the present invention apply to cells other than the chlorate cell. For example, the cell of the present invention may be employed in the electrolytic production of lithium from a fused lithium salt. The present invention thus provides a more efficient cell, permits cells of greater height (for example, in excess of 4 feet and in a commercial cell rarely less than 3 feet), and also permits closer spacing of the anode and cathode.

The present invention provides an electrolytic cell for the production of chlorates from chlorides. The cell has a substantially parallel cathode and anode. The cathode includes a back plate and a pervious plate which is spaced between the back plate and the anode. The pervious plate may be permeated by gaseous products and has a surface which is sloped with respect to the vertical so that the gaseous products liberated are immediately transported through the openings or channels in the pervious plate to a space provided between the back plate and the pervious plate and thus out of the critical area between the pervious plate and anode. The present invention may be provided in the form of a mono-polar cell or a bi-polar cell. Furthermore, the flow through the multi-electrode embodiments may be either a series flow or a parallel flow.

Figure 1:
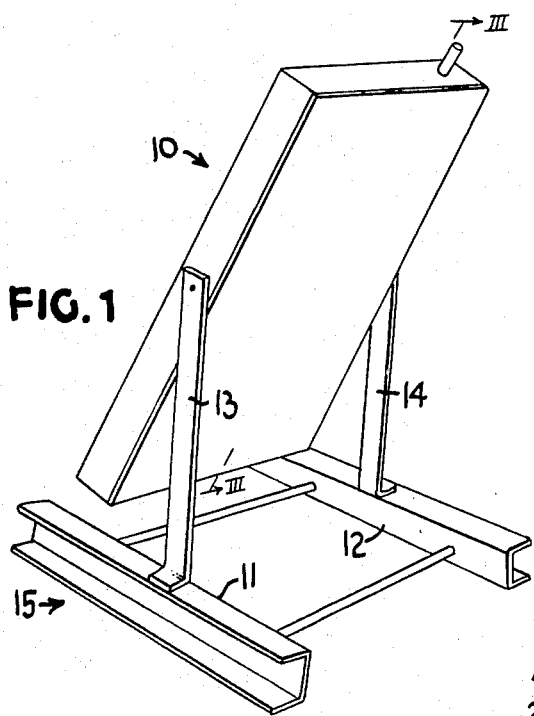
FIG. 1 is a perspective view of one embodiment of the present invention.
Figure 3:
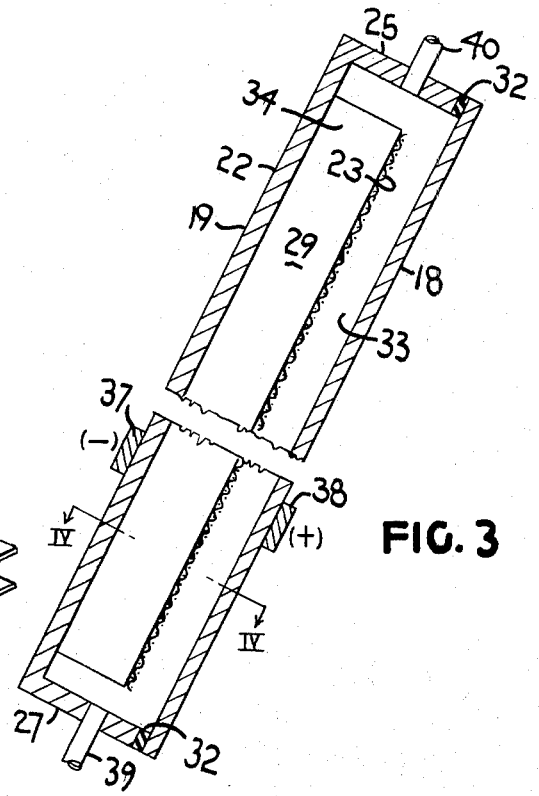
FIG. 3 is a broken, vertical, cross-sectional view taken along the line III–III in FIG. 1.
Figure 2:
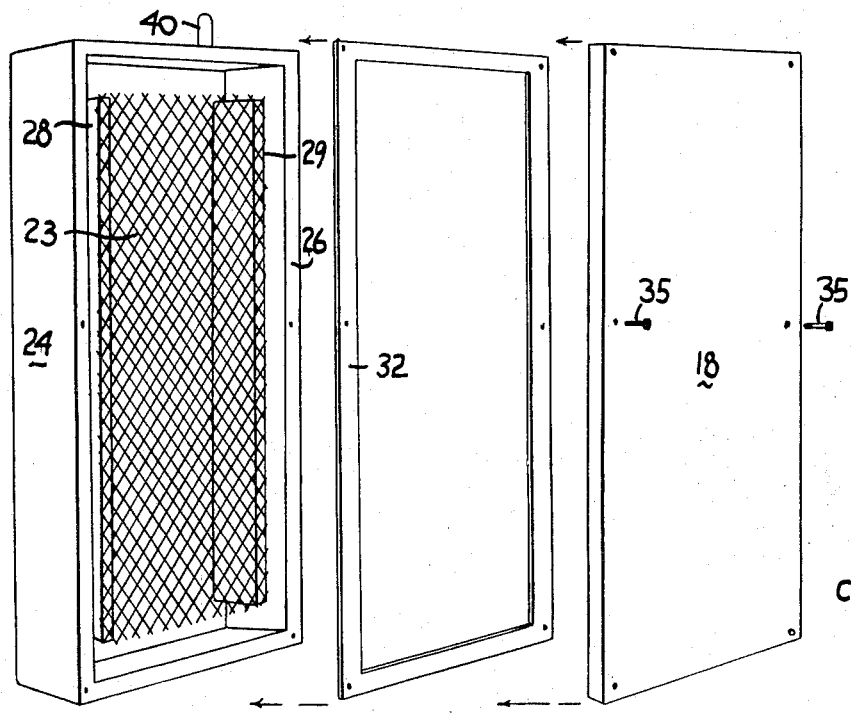
FIG. 2 is an exploded, persepective view of the embodiment shown in FIG. 1.
Figure 4:
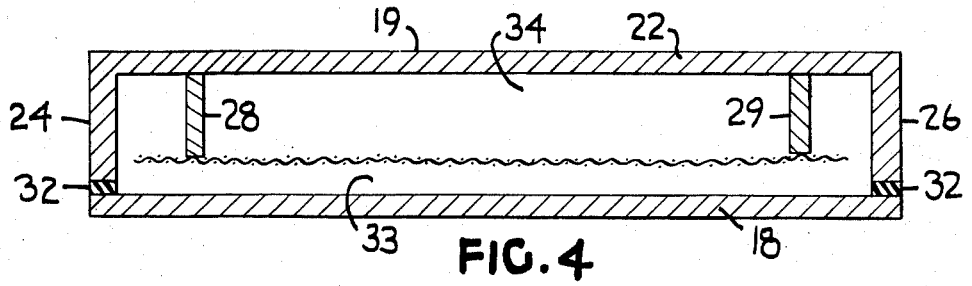
FIG. 4 is a cross-sectional view taken along the line IV—IV in FIG. 3.

The chlorate cell 10 of the present invention, one embodiment of which is illustrated in FIGS. 1–5, may be supported by any suitable means; for example, as illustrated in FIG. 1, the support means 15 includes a pair of spaced, horizontal base members 11 and 12 and a pair of upwardly-extending side members 13 and 14. The cell 10 is positioned between the side members 13 and 14 and may be secured thereto by any conventional means; for example, by bolts (not shown).

The cell 10 (FIG. 2) is comprised of an anode 18 and a cathode assembly 19. The anode 18 may be any conventional structure, and, preferably, includes a titanium base plate having an electrically-conductive, anodically-resistant coating. The coating may, for example, be comprised of one or a mixture of the platinum metals, such metals including ruthenium, rhodium, palladium, osmium, iridium, and platinum. The coating could, alternatively, be comprised of a platinum metal oxide, a mixture of platinum metal oxides, a mixture of a platinum metal and an oxide of an electrolytically film-forming metal such as titanium, or a mixture of a platinum metal oxide and another metallic oxide. For example, a mixture of ruthenium oxide and titanium oxide provides an excellent electrode coating. Any of various methods may be used for applying the coating to the titanium base plate, typically, precipitation of the metals or metallic oxides by chemical, thermal, or electrolytic methods. In certain cells the anode could be constructed of graphite, magnetite, or lead dioxide on a suitable substrate.

Figure 5:
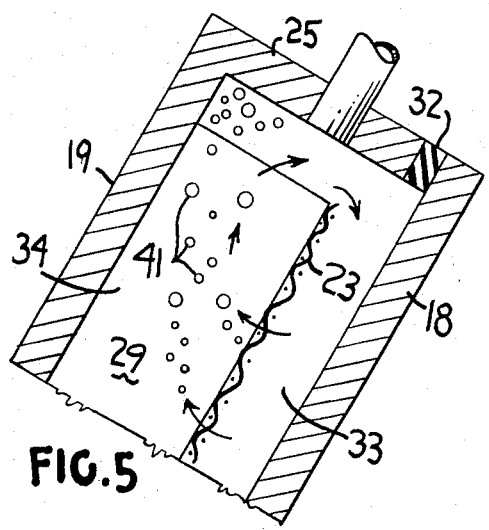
FIG. 5 is an enlarged portion of FIG. 3.

The cathode assembly 19 (FIGS. 2–5) is comprised of a back plate 22 and a pervious plate 23. The back plate 22 has a plurality of peripheral walls 24, 25, 26, and 27 which provide for spacing of the back plate 22 from the anode 18 and form a fluid-tight enclosure. The pervious plate 23 may be comprised of any suitable material, such as iron, steel, or nickel, having the necessary electroconductive properties. The pervious plate 23 is of such a structure that fluids can readily pass therethrough. Typically, the pervious plate will be comprised of rod material, screen, expanded metal mesh, perforated plate, or a louvered plate. The pervious plate 23 is spaced betweeen the back plate 22 and the anode 18. If desired, the pervious plate 23 may be supported by the vertical peripheral walls 24 and 26 or, alternatively, may be secured to the back plate 22 as shown in FIG. 5, by the metal bars 28 and 29 which may be of steel. It may be desirable to terminate the pervious plate 23 at a point spaced downwardly from the upper peripheral wall 25 to facilitate better circulation of the solution within the cell.

Preferably, the pervious plate 23 is between 40 and 80 percent open and, more preferably, between 50 and 70 percent open. Operation within such preferred ranges provides increased power efficiency. The term "percent open" as used herein means the amount of open area of the plate as compared to the total area of the plate expressed as a percentage. The "open area" of the plate is the portion of the plate through which the cell fluids can pass. The "total area" of the plate includes the open area plus the portion of the plate through which the fluids cannot pass. For example, a perforated plate having 5/32-inch holes on 7/32-inch centers provides a plate having 43 percent open area, as shown in Table I, and a pervious plate comprised of 1/4-inch; #20 gauge expanded mesh provides 45 percent open area.

If the back plate 22 is spaced within a certain distance of the pervious plate, the back plate 22 can be made of a ferrous metal and will be cathodically protected by electrical energy that passes between the back plate and the anode, such energy passing through the open area of the pervious plate. The passing of electrical energy from the back plate through the open area of the pervious plate to the anode will be hereinafter designated "electrical throw." A highly economical cell construction is provided by making the entire cell, other than the anode and gaskets, of a ferrous metal and cathodically protecting the exposed inner ferrous metal surfaces.

The spacing at which cathodic protection is present depends at least in part on the total electrical potential of the cell and on the percent of open area in the pervious plate. In order to provide the cathodic protection, the electrical potential between the back plate and the anode need not be great, providing the pervious plate is sufficiently open.

A voltage on the back plate of a chlorate cell with respect to a hydrogen reference electrode may be as low as 0.3 volt and yet provide protection. The maximum voltage on the back plate would be limited only to the maximum satisfactory voltage of the cell cathode which may be in the range of 1.5 to 3.0 volts with respect to such a reference electrode. Thus the voltage on the back plate, for example, may be between 0.3 and 3.0 volts. When the cell is operating under the hereinafter described normal operating conditions, the voltage on the back plate generally should be at least 0.7 volt and preferably should be at least 0.9 volt. The best protection is obtained when hydrogen is being liberated at the surface being protected.

Considerable latitude in the structure of the pervious plate, especially in the size of the openings, is permissible, consistent with certain underlying principles. The openings and the metal portions of the pervious plate must be small enough to provide even current distribution on the anode. On the other hand, the metal wires or web of the pervious plate 23 must be large enough to provide the necessary strength and rigidity. One perforate plate that was found to be highly satisfactory comprised a steel plate with 17/64-inch holes on 24/64-inch centers, thereby providing a plate having about 66 percent open area.

If desired, the back plate 22 could be coated with a chemically-resistant coating, typically, plastic or rubber and, in such case, the spacing of the back plate 22 and pervious plate 23 could be made greater.

Figure 6:
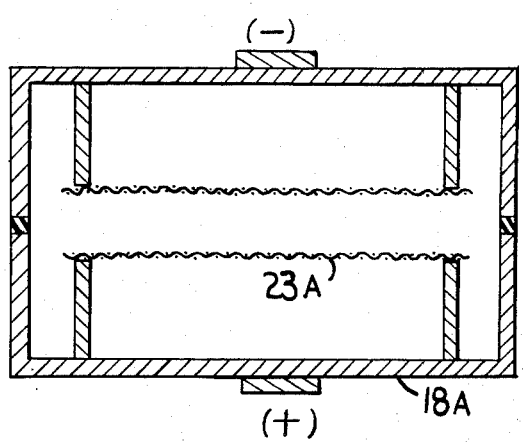
FIG. 6 is another embodiment of the present invention.

The anode could be provided with a pervious plate 23A similar to plate 23 as shown in FIG. 6. Such an anode 18A, however, sould have to be coated with a suitable stable electrode material, notably a noble metal such as platinum on the active surface 23A. Pervious electrodes provide greater electrode surface per given external cell dimension than do electrodes of solid plate. Furthermore, they permit variation in the fluid volume of the cell, and they permit cells to be built of greater depth which is desirable from the standpoint of ease in connecting piping.

The anode 18 and the cathode 19 serve in the present embodiment as the cell container. A separate cell container could be provided, however. The anode 18 and the cathode 19 are electrically insulated from each other by the insulating gasket 32 which may be of a chloroprene rubber such as Neoprene or fluoro carbon resin such as Teflon. The anode 18 and cathode 19 are secured together by any suitable means such as electrically insulated bolts 35 or clamps.

Electrical connections are provided on the anode 18 and the cathode 19 such as by conventional bus bars 37 and 38.

An interelectrode space 33 is provided between the anode 18 and the pervious plate 23 of cathode 19 in which electrolysis takes place. The space 33 is preferably between 0.1 and 0.5 inch in depth. Another space 34 is provided between the back plate 22 and the pervious plate 23 through which solution and gas may pass. The space 34 in the case of a high temperature chlorate cell is preferably between about 3 and 9 inches in depth.

The anode 18 and the cathode 19 are substantially parallel with one another and are supported in such a manner that they are sloped at an upwardly-diverging angle with respect to the vertical. It has been found that the best results are obtained if the angle of slope is between 5 and 45 degrees, preferably between 10 and 25 degrees, although the benefits of the present invention can be obtained at greater or lesser angles. The cell could be positioned horizontally with the pervious plate 23 disposed above the anode.

A solution inlet line 39 is provided through which solution may be added to the cell 10, and a solution outlet or product pipe 40 is provided through which cell products such as hydrogen gas and solution containing sodium chlorate may be removed from the cell.

A solution containing sodium chloride may be added to the cell 10 through inlet line 39 until the cell is substantially filled. The solution may be the mother liquor from an external product crystallizer in which case the solution, in addition to sodium chloride, would contain other materials, such as sodium chlorate. Also, the solution could be passed through an external circuit for temperature and pH control. The cell 10 may be operated, typically, under the following cell conditions:

Concentration of cell solution:
    Sodium chlorate—300–800 grams/liter
    Sodium chloride—60–200 grams/liter
Temperature: 70°–120° C. (preferably 90°–105° C.)
Current density: 100–600 amp./ft.$^2$ (preferably at least 300 amp./ft.$^2$)

The anode 18 and the cothode 19 are connected to an electrical source (not shown). An electrical potential is set up principally between the anode 18 and the pervious plate 23 of cathode 19. As water and sodium chloride pass between the anode 18 and the pervious plate 23, electrolysis takes place and hydrogen gas and sodium chlorate are produced.

Hydrogen and water vapor gases and some oxygen and chlorine rise in the cell as is shown by the small bubbles 41 in FIG. 5, passing through the pervious plate 23 and upwards in the space or passage 34 to the top of the cell. By so doing, the gases are immediately removed from the critical space 33 where electrolysis takes place, and thereby gas blinding is prevented or substantially reduced. Moreover, as the gases rise, circulation of the solution in the cell is produced, as illustrated by the arrows in FIG. 5, thereby preventing depletion of chloride ions in the critical electrolyzing space 33 and further preventing an excessive accumulation of hypochlorite and chlorate ions adjacent the anode.

The rising gases force or pull the dissolved cell products, notably, hypochlorite and chlorate ions from between the anode 18 and pervious plate 23, through the pervious plate 23, to passage 34. The passage 34 is preferably surrounded by walls having a cathodic potential of at least 0.3 volt, usually at least 0.7 volt and preferably at least 0.9 volt with respect to a hydrogen reference electrode. Such cathodic walls would include, for example, back plate 22, pervious plate 23, and peripheral walls 24, 25, 26 and 27.

The product stream from the cell may be passed through an external product crystallizer where a portion of the sodium chlorate is removed. The mother liquor from the external product crystallizer may be fortified with sodium chloride, reheated, and returned to the cell for further electrolysis.

Figure 7:
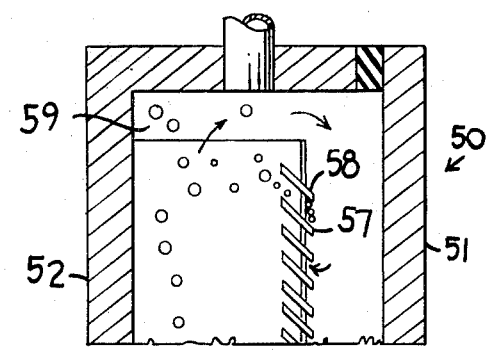
FIG. 7 is an embodiment of the present invention in which the cell is substantially vertical.
Figure 7:
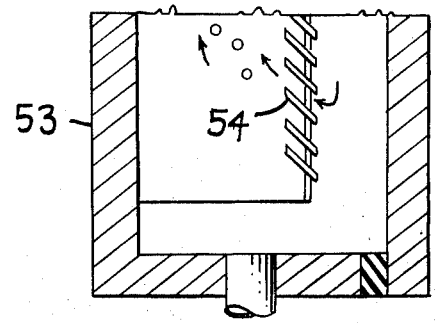

The cell 50, illustrated in FIG. 7, is another embodiment of the present invention. The cell 50, however, is disposed in a substantially vertical position. The cell 50 is comprised of an anode 51 and a cathode 52. The anode 51 may be identical to the above-described anode 18. The cathode 52 is comprised of a back plate 53 and a pervious plate 54. The back plate 53 may be very similar to back plate 22. The pervious plate 54, however, is of a louvered construction, having portions of its surface sloped with respect to the vertical. The cell 50 may be connected to feed and product lines and an electrical source in a manner similar to cell 10.

The operation of the cell 50 is substantially identical to the cell 10 except that the gas formed at the cathode is removed from the space between the cathode and anode by the sloped louvers. The hydrogen gas which comprises approximately 95 percent of the gas electrochemically produced and approximately 25 to 35 percent of the total gas produced in the cell is formed adjacent the surface of the louvers, such as 57 and 58. The gas rises until it strikes the lower surface of a louver and then moves along the lower surface until it reaches the back space 59. The movement of the hydrogen gas and the solution is otherwise the same as above described with respect to the cell 10.

The principle of cell 50 is also well suited for the electrolytic production of lithium metal from a fused lithium salt. Since the fluid lithium metal is less dense than the fluid lithium salt, it would rise in a conventional cell in a manner similar to that of hydrogen gas in the chlorate cell. The presence of substantial amounts of lithium and chlorine in the interelectrode space tends to reduce the current efficiency due to reaction between the lithium and chlorine. In cell 50 the fluid lithium metal is formed at the surface of louvers 57 and 58 and is removed from the critical space between the anode and the pervious plate in the same manner as hydrogen is removed in the chlorate cell.

Figure 8:
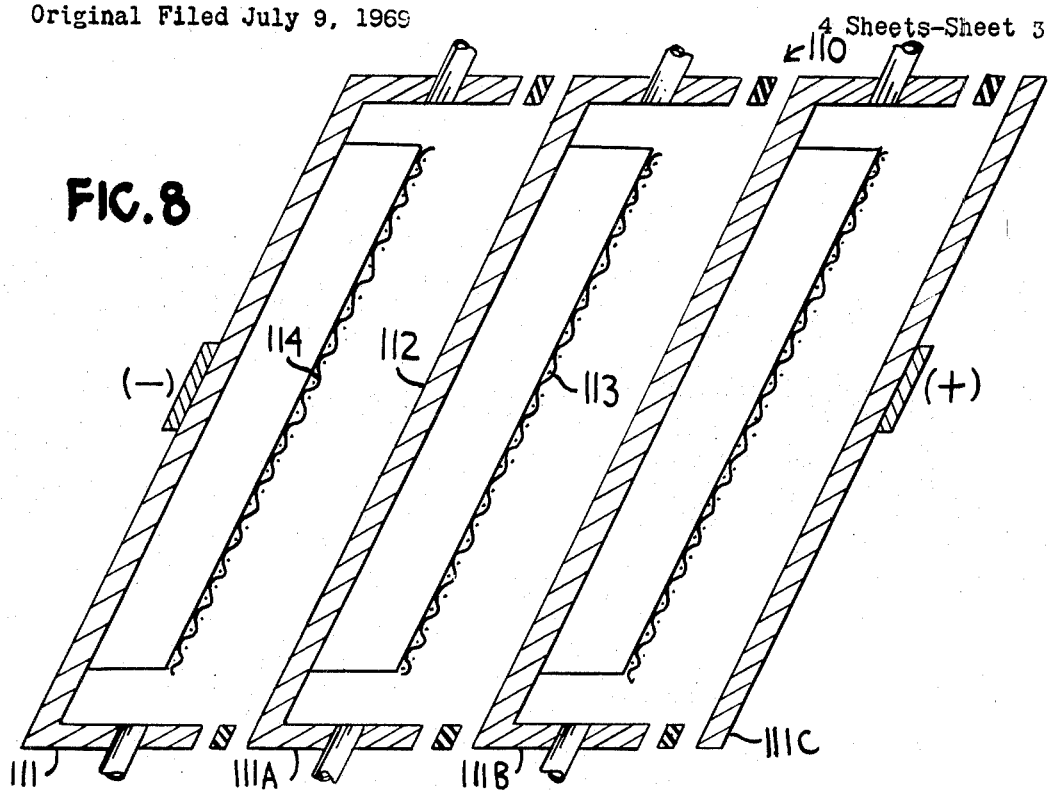
FIG. 8 is an exploded view of a bi-polar embodiment of the present invention.
Figure 9:
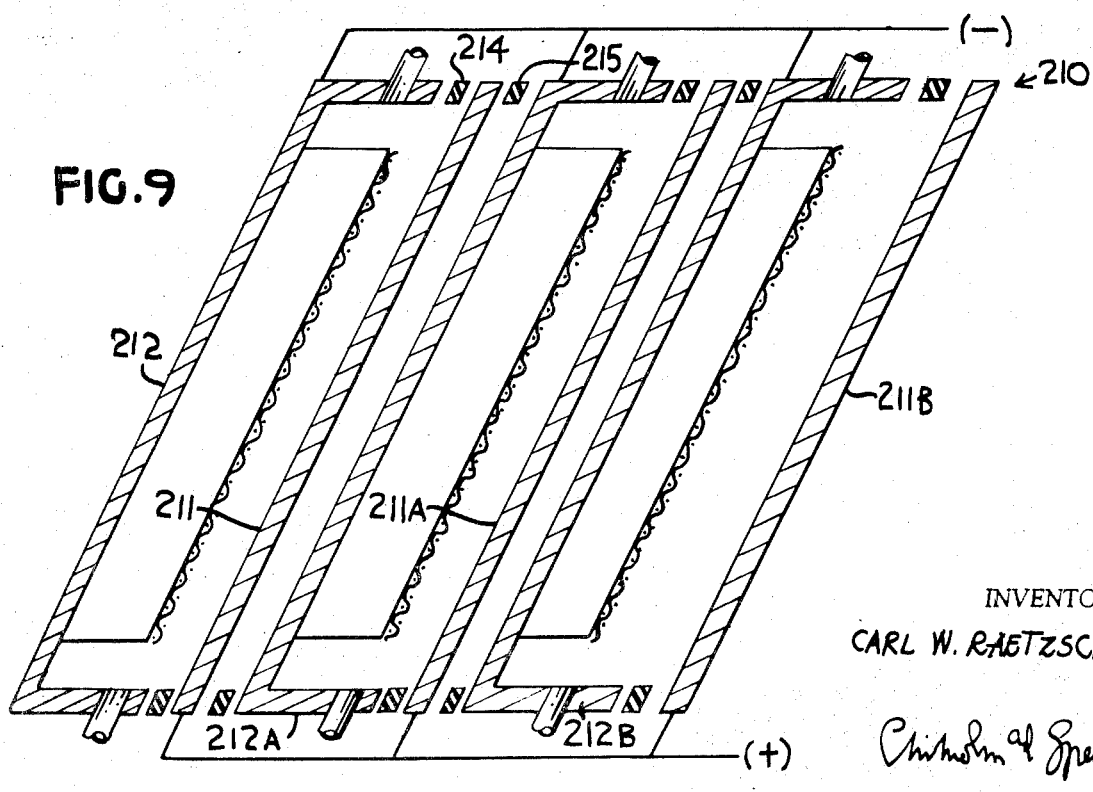
FIG. 9 is an exploded view of a multi-electrode, monopolar embodiment of the present invention.

The above-described cells 10 and 50 can be provided in the form of multiple electrode cells, such as shown in FIGS. 8 and 9. The cell 110 (FIG. 8) is a bi-polar cell and has a plurality of electrodes 111, 111A, 111B, and 111C. The electrode 111 serves as a cathode half cell and electrode 111C serves as an anode half cell. The intermediate electrodes, 111A and 111B, each has a first side 112 which serves as an anode and a second side 113 which serves as a cathode. Each of the electrodes which provide a cathode includes a pervious plate 114 which may be identical to either one of the above-described pervious plates 23 or 54. Those portions of the electrodes 111A, 111B, and 111C which serve as anodes may be made of titanium or other material suitable for anodic conditions and coated with a suitable electrode material, such as a platinum coating. A convenient method of constructing the electrodes 111–111C is to employ a titanium metal clad steel plate, the titanium metal being platinized and serving as the anode, titanium metal in this case meaning any of the anodic self-protective metals including tantalum, niobium, and titanium.

As shown in FIG. 8, the cell 110 may be provided with a parallel flow of solution between the various electrodes. However, if desired, the flow of solution through the multielectrode cell could be provided in series merely by moving outlet lines such that they extend between cell compartments, thereby requiring the solution to pass sequentially through each of the cell compartments.

A multi-electrode cell 210 may be provided of a monopolar type, as shown in FIG. 9. The cell 210 includes a plurality of anodes 211, 211A, 211B, and a plurality of cathodes 212, 212A, 212B. In this case, a pair of insulating gaskets are provided, one on either side of the electrodes, insulating the same from the adjacent electrodes. For example, anode 211 is insulated from cathode 212 by insulating gasket 214 and from the cathode 212A by insulating gasket 215. As shown in FIG. 9, anodes 211, 211A, and 211B are connected to an electrical source of negative electrical potential, and the cathodes 212, 212A, and 212B are connected to an electrical source of positive potential. The cell 210 may be provided with either a parallel flow or a series flow of solution.

EXAMPLE I

Figure 10:
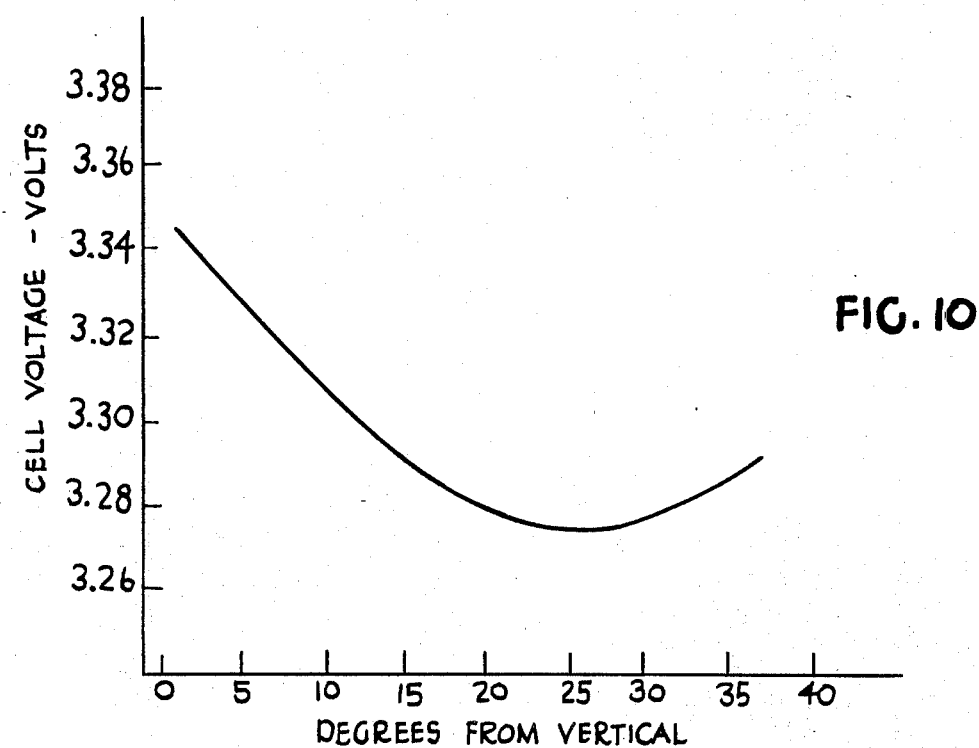
FIG. 10 shows a line-graph of cell voltage at various slopes.
Figure 11:
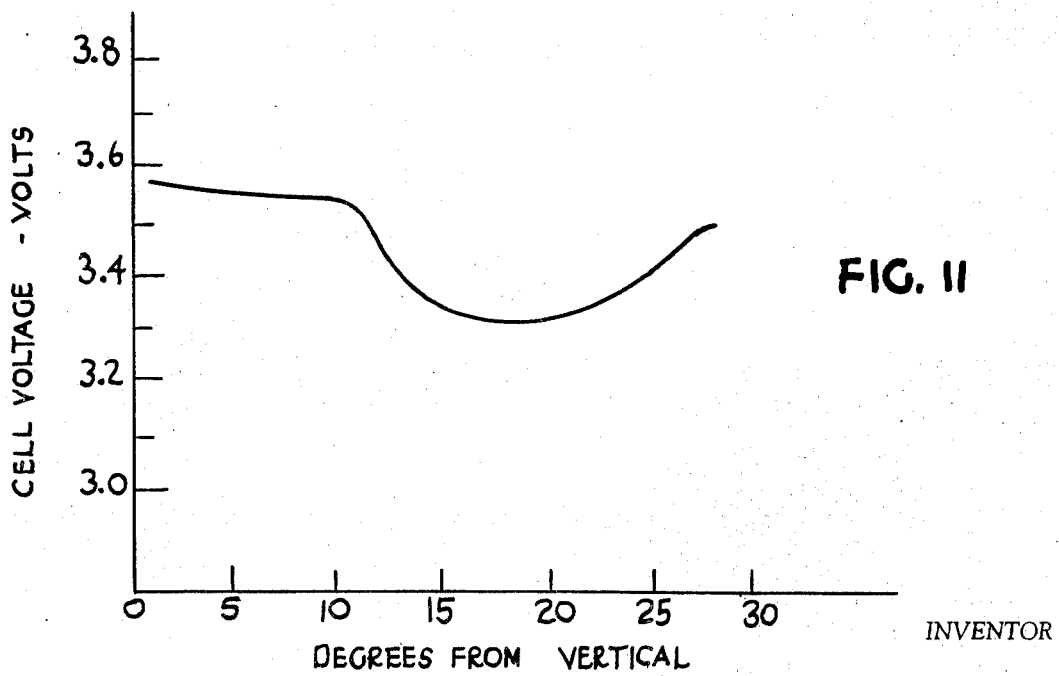
FIG. 11 shows a line-graph similar to FIG. 10 but at a different electrode spacing.

FIGS. 10 and 11 illustrate the effect that sloping the cell has on the voltage of the cell (i.e., the difference in potential between the anode and the pervious plate). The results shown in FIG. 10 were obtained in a cell substantially like the one shown in FIGS. 1–5. The internal dimensions were 1 foot in width, 1¾ inches in depth, and 4 feet in height. The cell had an active anode area of 4 inches by 30 inches or 120 square inches. The cathode had a mesh of 37 percent open area and the anode was a platinized titanium electrode. The inter-electrode space was ⅛ inch in depth and the current density was about 500 amps per square foot. The cell was set up in such a manner that a feed stream could be continuously fed into the cell and a product stream could be continuously removed from the cell. The concentration of the feed stream was: sodium chlorate, 502 grams per liter; and sodium chloride, 119 grams per liter. The concentration of the solution within the cell was maintained within the range: sodium chlorate, from 600 to 800 grams per liter; and sodium chloride, from 90 to 100 grams per liter. The pH of the feed stream was maintained between 6.1 and 6.3. The feed solution was heated to about 95° C. so that the temperature within the cell, as measured at a point 4 inches below the top of the cell, remained between 100 and 105° C. In this example, the best voltages were obtained at an angle of about 25° to 30° from the vertical, although a material effect is noted even at an angle of 5° from the vertical.

EXAMPLE II

The results shown in FIG. 11 were obtained in the cell used in Example I and under similar cell conditions except that the interelectrode spacing was changed to ¼ inch. The concentration of the feed stream was: sodium chlorate, 581 grams per liter; and sodium chloride, 108 grams per liter. The pH of the feed stream was between 6.1 and 6.3. The concentration of the sodium chlorate within the cell was maintained within the range of 600 to 800 grams per liter and sodium chloride between 90 and 100 grams per liter. The temperature within the cell was maintained between 100° C. and 105° C. In this example, the effect of sloping the cell is particularly noticeable at angles of between about 10° and about 25°. The best results obtained here were at angles of about 15° to 20° from the vertical where a voltage advantage of approximately 0.15 was obtained.

EXAMPLE III

The following example illustrates the effect various degrees of open area of the pervious plate has on the pervious plate potential and on back plate potential. This example also shows the effect of various spacings between the pervious plate and the back plate. A small laboratory cell was operated with the cathode at a slope of 23° from the vertical. The test electrodes were circular, having a 1 13/16 inch diameter. The anode-to-pervious plate spacing was ⅛ inch, and the pervious plate-to-back plate spacing was 6 inches. The anode current density was 500 amperes per square foot of pervious plate. The cell temperature was 105° C. The solution used contained 46.5 percent sodium chlorate and 6.1 percent sodium chloride.

The results obtained in the cell using pervious plates of various degrees of open area are shown in the following table. In this instance, the best results were obtained at 66 percent open area with a perforated plate.

TABLE I

| Type of perforated plate | Open area (percent) | Pervious plate potential (volts)[1] | Back plate potential (volts)[1] |
| --- | --- | --- | --- |
| 5/32-inch holes x 7/32-inch centers x 0.100-inch thickness | 43 | 1.67 | 0.64 |
| 3/64-inch holes x 7/16-inch centers x 0.0667-inch thickness | 46 | 1.61 | 0.90 |
| 5/16-inch holes x 3/8-inch centers x 0.0720-inch thickness | 61 | 1.57 | 0.91 |
| 17/64-inch holes x 5/16-inch centers x 0.0551-inch thickness | 66 | 1.54 | 0.99 |

[1] Electrode potential measurements were made conventionally using Ag/AgCl reference electrode connected to a luggin probe by means of a "salt bridge" containing 18 percent NaClO₃, and 6 percent NaCl. Voltage measurements were made with a high impedance digital volt meter which read directly to 1 millivolt. The measured value was converted to a potential with respect to a hydrogen reference electrode by adding 0.22 volt to the measured value. The values shown above are the converted values. The temperature of the reference electrode was 25° C.

The above-described cell, using a pervious plate of the perforated type having 66 percent open area, was operated with the back plate spaced at various distances from the pervious plate. All other cell conditions remained the same. At 5 inches the back plate potential was 1.01 volts, at 6 inches the potential was 0.99, and at 8 inches the potential was 0.88. In each instance the back plate received sufficient cathodic protection to prevent corrosion of the ferrous metal.

Although the present invention has been described with reference to the specific details of particular embodiments thereof, it is not intended thereby to limit the scope of the invention except insofar as the specific details are recited in the appended claims.

I claim:
1. A method of preparing alkali metal chlorate which comprises electrolyzing an aqueous solution of alkali metal chloride in an electrolytic cell unit between an anode and a cathode whereby to evolve the alkali metal chlorate in the solution and gaseous hydrogen, removing the major portion of the evolved hydrogen from between the anode and cathode through the cathode to a space adjacent the side of the cathode remote from the anode, said space being largely surrounded by cathodic walls and removing hydrogen from the unit while the hydrogen is on said remote side.

2. The method of claim 1 wherein the hydrogen is removed through the cathode into a chamber defined by walls including the cathode, the potential of the cathodic walls other than the cathode being held low enough to prevent evolution of hydrogen thereon.

3. The method of claim 2 wherein said other walls have a potential of at least 0.3 volt with respect to a hydrogen reference electrode.

4. The method of claim 1 wherein the hydrogen is removed through the cathode into a chamber defined by walls including the cathode, the potential of the walls other than the cathode being sufficient to liberate hydrogen thereon.

5. The method of claim 4 wherein said other walls have a potential of at least 0.7 volt with respect to a hydrogen reference electrode.

6. The method of claim 4 wherein said other walls have a potential of at least 0.9 volt with respect to a hydrogen reference electrode.

7. The method as described in claim 1 wherein said aqueous solution contains at least 300 grams per liter of sodium chlorate, 60 grams per liter of sodium chloride, and wherein the solution is at a temperature of at least 70° C.

8. The method as described in claim 7 wherein the current density on each of said electrodes is at least 300 to about 600 amperes per square foot.

9. The method as described in claim 7 wherein the chemical reaction producing alkali metal chlorate reaches completion within the electrolytic cell.

10. The method as described in claim 8 wherein the temperature of the solution is between 90° and 105° C.

11. A method of preparing alkali metal chlorate which comprises electrolyzing an aqueous solution of alkali metal chloride in an electrolytic cell unit and between an anode and a pervious cathode whereby to evolve the alkali metal chlorate in the solution and gaseous hydrogen, pulling the major portion of the evolved alkali metal chlorate from between the anode and cathode, through the cathode to a space adjacent the side of the cathode remote from the anode.

12. The method of claim 11 wherein the alkali metal chlorate is removed through the cathode into a chamber defined by walls including the cathode and wherein the walls defining said chamber are cathodic with respect to said anode, said walls other than said cathode having a potential of at least 0.3 volt with respect to a hydrogen reference electrode.

13. The method of claim 12 wherein the potential of said other walls is maintained sufficiently low to prevent evolution of hydrogen thereon.

14. The method of claim 12 wherein the potential of said other walls is at least 0.7 volt with respect to a hydrogen reference electrode.

15. The method of claim 12 wherein the potential of said other walls is at least 0.9 volt with respect to a hydrogen reference electrode.

16. In the electrolysis of an aqueous alkali metal chloride solution in the interelectrode space between spaced members of an electrode pair wherein gases are evolved at or near an anode surface which faces the interelectrode space, the improvement which comprises passing such evolved gases through a gas permeable metallic anode and to a passage on the side thereof remote from the interelectrode space and removing the gases from the cell through said passage.

References Cited

UNITED STATES PATENTS

| | | | |
|---|---|---|---|
| 496,863 | 5/1893 | Craney | 204—266 |
| 1,302,824 | 5/1919 | Marsh | 204—266 |
| 3,344,053 | 9/1967 | Neipert et al. | 204—263 X |
| 3,385,779 | 5/1968 | Nishiba et al. | 204—95 X |
| 3,493,478 | 2/1970 | Udupa et al. | 204—95 |
| 3,516,918 | 6/1970 | Grotheer et al. | 204—266 X |

FOREIGN PATENTS

| | | | |
|---|---|---|---|
| 740,862 | 8/1966 | Canada | 204—253 |

FREDRICK C. EDMUNDSON, Primary Examiner

U.S. Cl. X.R.

204—258, 266